May 29, 1934.  W. D. GRASSMUECK  1,960,535
CREAM CONE
Filed March 31, 1932

Inventor
W. D. Grassmueck
By Emil F. Lange
Attorney

Patented May 29, 1934

1,960,535

UNITED STATES PATENT OFFICE 1,960,535

CREAM CONE

Webster D. Grassmueck, Lincoln, Nebr.

Application March 31, 1932, Serial No. 602,172

2 Claims. (Cl. 210—51.5)

My invention relates to devices for separating cream from milk and for handling the cream and milk independently when they are taken from the milk bottle.

The primary object of the invention is the provision of a device which may be inserted into the milk bottle before being capped in a manner such that the cream in rising will be largely segregated from the milk so that it may be withdrawn from the bottle without the use of special utensils.

Another of my objects is the provision of a receptacle which may be inserted in a milk bottle for receiving the cream as it rises, the receptacle being removable from the milk bottle and so designed that the cream may readily be removed from the receptacle without waste of cream.

An important object of the invention is the provision of a low cost receptacle of the kind specified which may be applied to nearly all milk bottles without modification of the milk bottles or of the milk bottle caps commonly used in dairies.

Having in view these objects and others which will be pointed out in the following description, I will now refer to the drawing, in which Figure 1 is a perspective view of the neck portion of a milk bottle with my cream cone inserted, a side wall of the cream cone being broken away to disclose the bottom wall and the apertures in the bottom wall.

Figure 1:
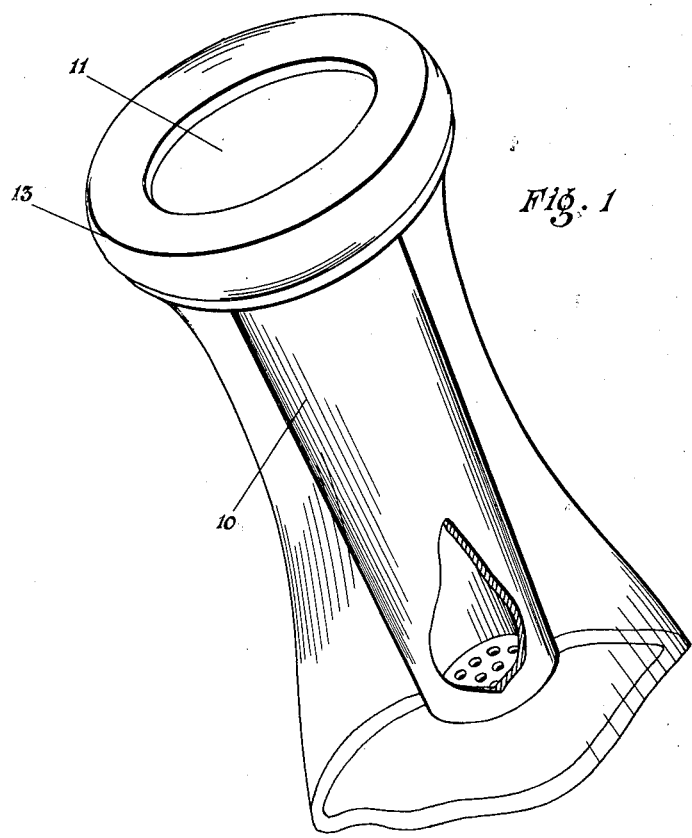

The cream cone is preferably integral in construction but it consists of several parts to conform to the shape of the neck of the milk bottle. In general, the cream cone consists of a cream receptacle having means for attachment to the milk bottle and having a seat for the cap which is normally applied to the milk bottle itself.

The body portion 10 of the cream cone is preferably frusto-conical in shape, tapering very slightly from top to bottom. This is shown in my drawing but it should be understood that the drawing materially accentuates this slope in order to more clearly bring out the fact that the walls slope. Since the cream cone is to be inserted through the mouth of the bottle, it is somewhat more convenient to have the lower end of the cone slightly smaller than the upper end for the easy insertion of the cream cone. The top of the cream cone is, however, of such size that it seats very snugly against the inner walls of the milk bottle at the mouth of the milk bottle. The main purpose of the sloping walls is, however, the ease of nesting a large number of cream cones for shipment or storage so that they will occupy very little space and so that they will protect each other from damage.

Milk bottles are provided with seats for the milk bottle caps 11 which are in common use. I therefore shape my cream cone in accordance with the shape of the milk bottle to provide an annular seat 12 for the cap 11 which would otherwise seat in the bottle itself. The cream cone is further provided with an annular looped portion 13 for seating over the lip of the milk bottle. The material of the entire cream cone is more or less flexible and this can be shaped after application to the milk bottle so that the edge of the annular looped member 13 will seat tightly against the milk bottle.

Figure 2:
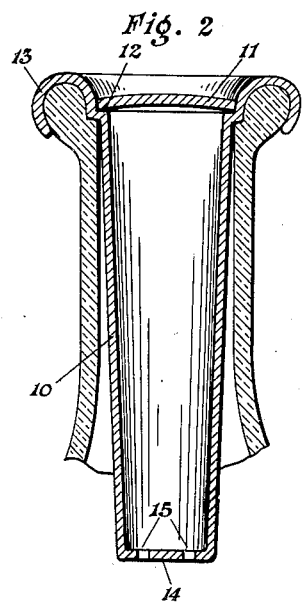
Figure 2 is a view in median longitudinal section of the neck portion of a milk bottle and of my cream cone inserted therein.
Figure 3:
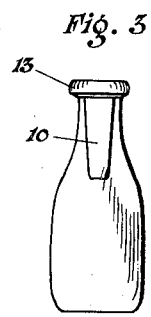
Figure 3 is an elevational view in reduced scale showing a milk bottle with my cream cone applied thereto.

The cream cone is further provided with a bottom 14 having apertures 15 as shown in Figures 1 and 2. The purpose of these apertures is two-fold. During the rising of the cream in the bottle, the cream may enter the receptacle 10 through the apertures 15 and the heavier milk may pass out of the receptacle through the same apertures. Then after removal of the cream cone from the milk bottle, the air pressure will maintain the cream within the cream cone due to the closure by means of the cap 11. The cream may be removed from the cream cone preferably by tilting the cone to cause the cream to flow out through apertures 15. The cream may also be removed from the cream cone through the apertures 15 by puncturing the cap 11 to admit air pressure to the contents of the cream cone or by crushing the cap or it may be poured out after removing the cap.

The cream cones leave the manufacturer in nested condition, it being possible to nest a large number of these in a column. They are then applied in the dairy to the milk bottles preferably after the bottles leave the filling machine. In their nested condition the curved portions 13 are flared out somewhat but in their application to the bottle they are given a slight crimping pressure to force them into intimate contact with the lip of the bottle. In the smaller dairies they are inserted by hand but the larger dairies may use special inserting machines. After the insertion of the cream cones the bottles go directly to the capping machine which operates without change in applying the caps which would otherwise be inserted directly into the mouth of the bottle. The cream rises ordinarily between the time of the filling of the bottles and the reception of the milk by the householder. The householder then merely grasps the outside edges of the cream cone and lifts it bodily with its cream contents from the milk bottle. A small amount of cream is left with the milk in the bottle, this cream being the cream which rises on the outer side of the cream cone. The cream and milk are thus segregated before reaching the consumer and they may be kept segregated after the opening of the bottle. They require no siphons or other utensils, such as are frequently used for the purpose. Such tools require washing and they are too apt to be misplaced to make them serviceable for withdrawing the cream from the bottles. The present device is in the bottle on delivery of the milk and when it is withdrawn and emptied, it may be crushed and thrown into the waste paper basket, the cap being first removed from the cream cone and then inserted to close the mouth of the bottle.

The cream cone may be made of any suitable material. The most suitable material at the present time is probably the paper of the kind used in the making of paper drinking cups. This material is very low in cost and it is easily shaped into the form described. It is impregnated and surfaced with a wax or paraffin coating so that it is impervious to the milk and cream. It is sanitary and it has a color which blends easily with the color of the cream or milk. In the filled bottle the cream cone thus becomes invisible and the only evidences of its presence are on the outside of the lip of the bottle. The coating not only prevents the penetration of the milk and cream into the material of the cream cone but it repels them so that there is no waste of cream when the cream cone is discarded after it has been emptied. The volume of milk displaced by the cream cone in the milk bottle is negligible.

The cream cone is fully as sanitary as the present milk bottle arrangement. Dust collecting on the caps can easily be wiped off. If the lip of the bottle is slightly chipped, the flange of the cream cone will entirely cover and protect the chipped portion of the lip. The cream cone has a peculiar advantage in very cold weather when the milk is apt to freeze after it has been delivered but before it is taken into the house. When this occurs with the bottle not provided with the cream cone, a plug of frozen cream is forced out through the mouth of the bottle to project several inches above. With the cream cone, however, the cone itself with its contents is forced out. The waxy outer surface of the cone repels dust so that the cream is in much cleaner condition when it is enclosed within the cone. Moreover, cats and dogs have access to an unprotected frozen plug of cream but the cream cone encloses the plug and makes it impossible for cats and dogs to lick the cream.

Having thus described my invention in such full, clear, and exact terms that its construction and operation will be readily understood by others skilled in the art to which it pertains, what I claim as new and desire to secure by Letters Patent of the United States is:

1. A cream cone for insertion into a milk bottle having an annular ledge for seating a milk bottle cap, said cream cone including a tubular body member having an outturned flange at its upper extremity for seating on the annular ledge of the milk bottle and for providing an annular ledge for seating the milk bottle cap, and an apertured bottom wall for said tubular body member whereby the cream in the milk bottle may rise into said tubular body member, the apertures of said bottom being unobstructed and of a size to prevent the escape of the cream until atmospheric pressure is admitted thereto by the removal of the milk bottle cap from said cream cone.

2. A cream cone for insertion into a milk bottle having an annular ledge for seating a milk bottle cap, said cream cone including a hollow frusto-conical member having an outturned annular flange at its upper extremity for seating on the annular ledge of the milk bottle and for providing an annular ledge for seating the milk bottle cap, the upper diameter of said member being substantially that of the inner diameter of the mouth of the milk bottle and the cross section of said member decreasing gradually toward the cream line of the milk bottle, and an apertured bottom wall for said body member whereby the cream in the milk bottle may rise into said body member, the apertures of said bottom being unobstructed and of a size to prevent the escape of the cream until atmospheric pressure is admitted thereto by the removal of the milk bottle cap from said cream cone.

WEBSTER D. GRASSMUECK.